No. 675,028. Patented May 28, 1901.
J. TRIER.
BRAKE MECHANISM FOR AUTOMOBILES.
(Application filed Apr. 26, 1900.)
(No Model.) 2 Sheets—Sheet 2.
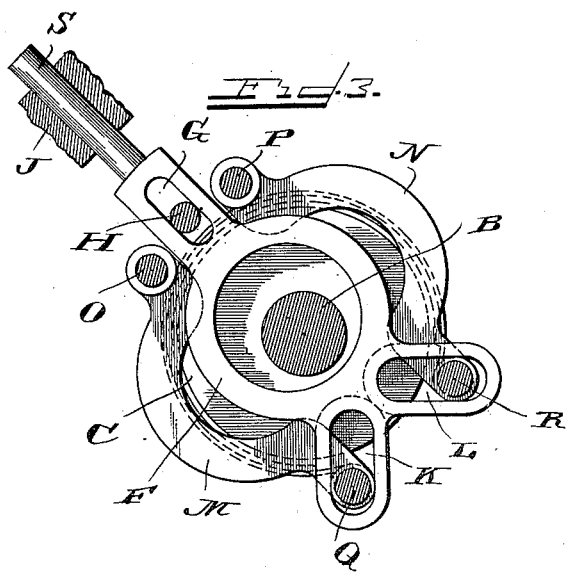
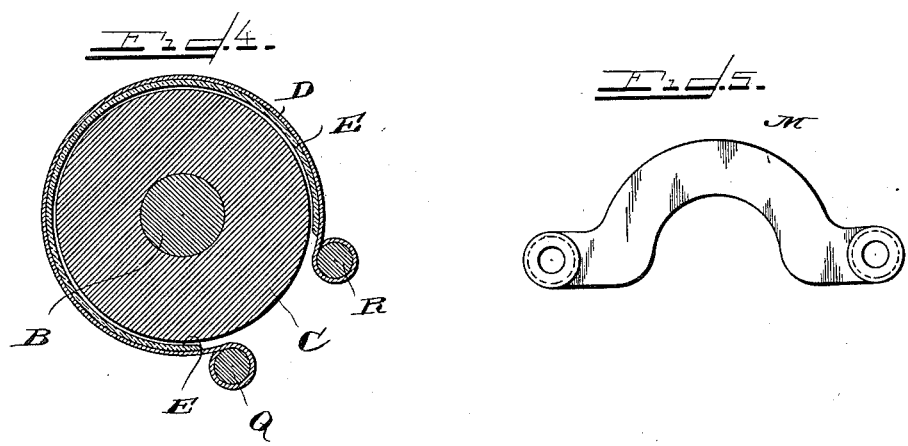
Witnesses
H. S. Gaither
Robert Weir
Inventor
John Trier
By Brown + Darby
Att'ys

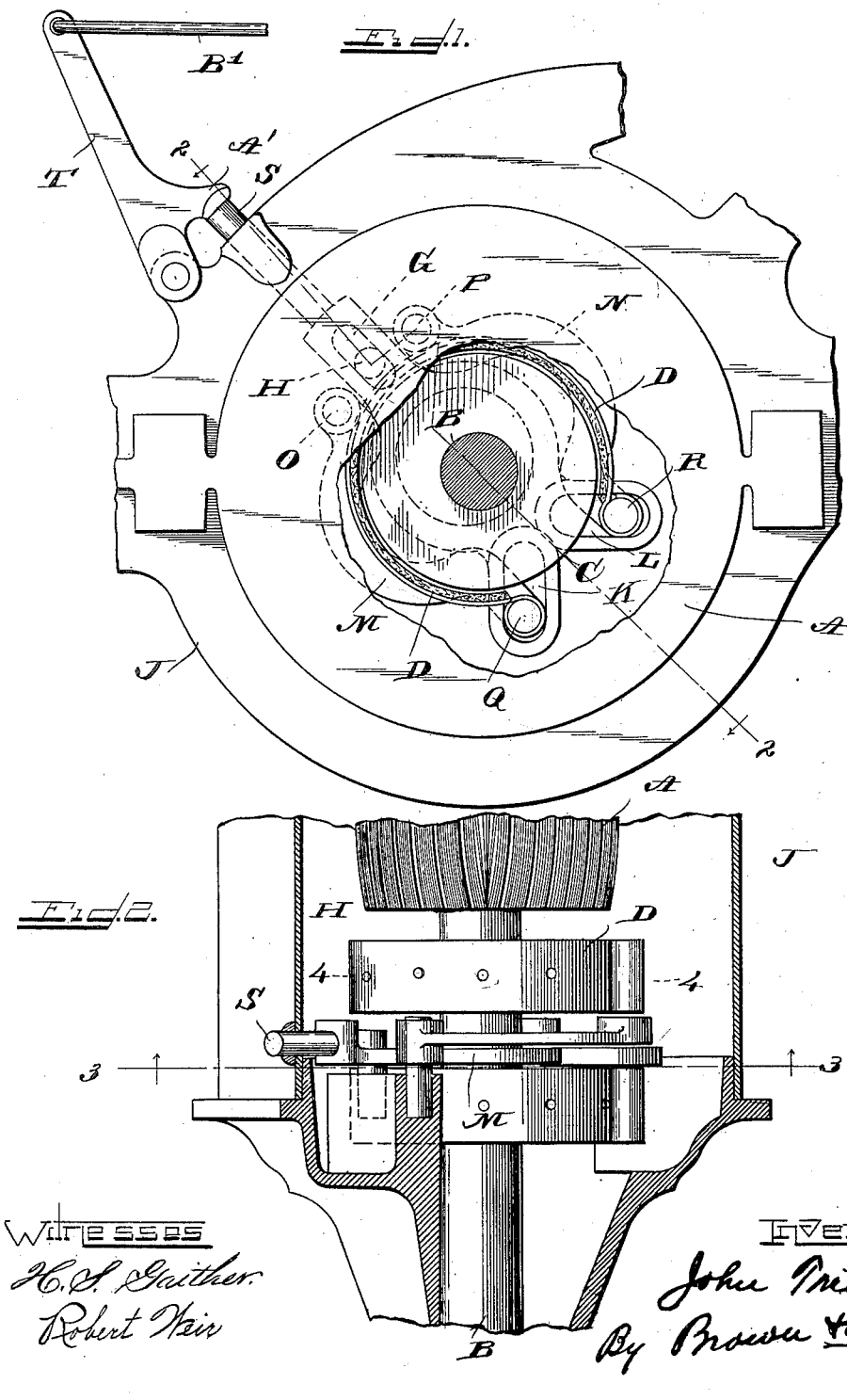

UNITED STATES PATENT OFFICE.

JOHN TRIER, OF CHICAGO, ILLINOIS, ASSIGNOR, BY MESNE ASSIGNMENTS, TO DONALD GRANT, OF FARIBAULT, MINNESOTA.

BRAKE MECHANISM FOR AUTOMOBILES.

SPECIFICATION forming part of Letters Patent No. 675,028, dated May 28, 1901.

Application filed April 26, 1900. Serial No. 14,398. (No model.)

*To all whom it may concern:*

Be it known that I, JOHN TRIER, a citizen of the United States, residing at Chicago, in the county of Cook and State of Illinois, have invented a new and useful Brake Mechanism for Automobiles, Electric Carriages, or Similar Vehicles, of which the following is a specification.

This invention relates to brake mechanism for automobiles, electric carriages, or similar vehicles.

The object of the invention is to provide a brake mechanism for vehicles of the character referred to which is simple in construction and efficient in operation.

The invention consists, substantially, in the construction, combination, location, and arrangement of parts, all as will be more fully hereinafter set forth, as shown in the accompanying drawings, and finally pointed out in the appended claims.

Referring to the accompanying drawings, and to the various views and reference-signs appearing thereon, Figure 1 is a view in end elevation, parts being broken away, of the driving-shaft of an automobile or similar vehicle, showing the application thereto of a brake mechanism constructed in accordance with the principles of my invention. Fig. 2 is a broken longitudinal sectional view of the same on the line 2 2, Fig. 1, looking in the direction of the arrrows. Fig. 3 is a transverse section through the brake mechanism on the line 3 3, Fig. 2, looking in the direction of the arrows. Fig. 4 is a transverse section through the brake-wheel on the line 4 4, Fig. 2. Fig. 5 is a detached detail view of a brake-strap-operating lever or arm.

The same part is designated by the same reference-sign wherever it occurs throughout the several views.

In the operation of an automobile, electric carriage, or similar vehicle it is exceedingly desirable to provide an efficient brake mechanism, whereby the brakes may be quickly applied and the carriage or other vehicle brought to rest. It is the special purpose of my present invention to provide a construction which is simple, economical, and efficient for accomplishing the desired result.

In the accompanying drawings I have illustrated a construction embodying the principles of my invention wherein reference-sign A designates the motor, and B the motor-shaft. Upon said shaft B is mounted one or more brake pulleys or wheels C. Upon each brake-wheel C is arranged a brake-strap D, which may be of the usual construction of brake bands or straps and adapted to encircle the brake-pulley. If desired, the brake band or strap may be provided with a lining of some suitable material, such as leather, for increasing its gripping effect upon the surface of the brake-wheel when said band or strap is applied to said wheel to brake the same. Arranged adjacent to the brake-wheel is a casting F, having a central opening of considerably-larger diameter than the diameter of shaft B and through which the shaft B passes, as clearly shown in Fig. 3, whereby said casting or plate may have a sliding movement with respect to and transversely of the shaft. This plate or casting is provided with a slot G, extending in a line transversely of the shaft, and in which operates a pin or projection H, formed on or carried by an adjacent or convenient part of the frame or casing J, in which the motor is mounted and whereby the plate or casting F is guided in the sliding movement thereof transversely with respect to shaft B. At its opposite side or end plate or casting F is provided with slots K L, said slots being inclined or diverging outwardly away from each other, as most clearly shown in Figs. 1 and 3.

Reference-signs M N designate levers or arms each pivotally hung at one end thereof, as at O P, respectively, upon suitable pins carried by or formed on a convenient part of the stationary frame. The opposite end of lever M is provided with a pin Q, arranged to project therefrom and into the inclined slot K of the plate or casting F. Similarly the free end of lever N is provided with a pin or projection R, arranged to be received in the inclined slot L of the plate or casting F. The pins Q and R also respectively engage in the ends of the brake strap or band D, as clearly shown in Figs. 1 and 4.

From the foregoing description it will be seen that when the plate or casting F is shifted transversely with respect to shaft B in one direction the engagement of the pins Q R in inclined slots K L will cause said pins to approach each other, thereby applying the brake band or strap to the brake-pulley, and when said plate or casting F is shifted in the opposite direction the pins Q R, riding in the slots K L, will be separated, thereby releasing the brake band or strap from the brake-pulley. The plate or casting F is provided with a projection S, arranged to project through a convenient part of the motor casing or support in position to be suitably engaged for effecting the shifting thereof to set or release the brake band or strap.

Many different constructions may be employed for effecting the shifting of the plate or casting F. I have shown a simple and convenient arrangement for accomplishing this purpose, wherein a lever T (see Fig. 1) is pivotally mounted upon a convenient part of the framework or casing, said lever being provided with a heel or projection A', arranged to bear against the end of projection S of the shifting plate F. The lever T may be rocked or swung in a direction to cause the plate F to be shifted transversely of the shaft B to apply the brake-band in any suitable manner, as by means of a rod or other convenient connection, (indicated at B',) and which may extend into convenient position to be manipulated by the driver of the carriage.

By the arrangement above described I provide an exceedingly simple and efficient braking arrangement, whereby the brake may be applied instantly when occasion requires.

It may sometimes be desired to apply a very strong braking effect to the motor-shaft in order to not only check the movement of the carriage, but to stop it instantly. In order to effect this result instantly and efficiently, I may provide the motor-shaft with two brake wheels or pulleys, as clearly indicated in Fig. 2, with a brake band or strap similar in all respects as above described, applied to each pulley or wheel. In this construction the operating devices by which the brake bands or straps are applied, including the shifting plate or casting F and the levers M N, may be located between the two brake wheels or pulleys, only one shifting plate or casting and one set of operating-arms M N being employed for both brake bands or straps. In this construction the pins Q R, carried by the free ends of levers M N, engage corresponding ends of both straps or bands, as will be readily understood. Thus by shifting plate or casting F both bands or straps will be instantly and simultaneously applied with a braking effect upon the brake wheels or pulleys.

It is obvious that many changes and variations in the details of construction and arrangement would readily suggest themselves to persons skilled in the art and still fall within the spirit and scope of my invention. I do not desire, therefore, to be limited or restricted to the exact details of construction shown and described; but, Having now set forth the object and nature of my invention and a construction embodying the principles thereof, what I claim as new and useful and of my own invention, and desire to secure by Letters Patent, is—

1. In a brake arrangement for automobiles, electric carriages or similar vehicles, a shaft, a brake-wheel mounted thereon, a brake-strap adapted to be applied to said wheel, a plate arranged to be shifted laterally with respect to said shaft, connections between said plate and brake-strap whereby when said plate is shifted laterally with respect to said shaft said brake-strap is applied or released, and means under control of the vehicle-driver arranged to engage said plate to shift the same, as and for the purpose set forth.

2. In a braking attachment for automobiles, electric carriages or similar vehicles, a shaft, a brake-wheel mounted thereon, a brake band or strap adapted to be applied to said brake-wheel, levers having pins arranged to engage the ends of said strap, a slotted plate with which said levers engage, and means, under the control of the driver, for moving said plate, thereby drawing said pins toward each other, whereby said brake-band is applied to said wheel, as and for the purpose set forth.

3. In a brake attachment for automobiles, electric carriages or similar vehicles, a shaft, a brake-wheel mounted thereon, a brake band or strap adapted to be applied to said wheel, levers pivotally mounted at one end and carrying pins at their free ends, said pins respectively engaging the ends of said brake band or strap, a plate or casting having inclined slots arranged to receive said pins, and means for shifting said plate or casting, whereby said pins are drawn together to apply said strap to the brake-wheel, as and for the purpose set forth.

4. In a braking arrangement for automobiles, electric carriages or similar vehicles, a shaft, a brake-wheel mounted thereon, a brake band or strap adapted to be applied to said wheel, a plate or casting arranged for movement laterally with respect to said shaft, and having inclined slots, means connected to the ends of said band or strap and engaging said inclined slots, and means for shifting said plate or casting laterally with respect to said shaft, as and for the purpose set forth.

5. In a braking arrangement for automobiles, electric carriages or similar vehicles, a shaft, a brake-wheel mounted thereon, a brake band or strap adapted to be applied to said brake-wheel, a plate or casting arranged for movement laterally with respect to said shaft and provided with inclined slots, means connected to the ends of said brake-band and engaging said slots, means for shifting said plate or casting laterally with respect to said shaft, and means for guiding said plate or casting in the shifting movements thereof, as and for the purpose set forth.

6. In a braking arrangement for automobiles, electric carriages or similar vehicles, a shaft, a brake-wheel mounted thereon, a brake-strap adapted to be applied to said brake-wheel, a pair of levers pivotally supported at one end and having pins in the free ends thereof arranged to engage said brake-strap, a plate or casting having an enlarged central opening through which said shaft passes, said plate provided with outwardly-diverging slots arranged to receive said pins, means for shifting said plate laterally with respect to said shaft, and means for guiding said plate in the shifting movements thereof, as and for the purpose set forth.

7. In a braking arrangement for automobiles, electric carriages or similar vehicles, a shaft, a pair of brake-wheels mounted thereon, a brake-band for each wheel, a plate arranged intermediate said wheels and having inclined slots, means connected to corresponding ends of each brake-band and engaging, respectively, in said inclined slots, and means for shifting said plate, whereby said brake-bands are simultaneously applied to said brake-wheels, as and for the purpose set forth.

In witness whereof I have hereunto set my hand, this 10th day of March, 1900, in the presence of the subscribing witnesses.

JOHN TRIER.

Witnesses:
E. C. SEMPLE,
S. E. DARBY.